(12) United States Patent
Chinniah et al.

(10) Patent No.: US 7,438,454 B2
(45) Date of Patent: Oct. 21, 2008

(54) LIGHT ASSEMBLY FOR AUTOMOTIVE LIGHTING APPLICATIONS

(75) Inventors: Jeyachandrabose Chinniah, Canton, MI (US); Edwin Mitchell Sayers, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/288,518

(22) Filed: Nov. 29, 2005

(65) Prior Publication Data

US 2007/0121331 A1 May 31, 2007

(51) Int. Cl.
*F21V 9/00* (2006.01)

(52) U.S. Cl. ........................................ 362/500; 362/511

(58) Field of Classification Search .................. 362/500, 362/511, 545, 244, 237, 334, 332, 328
See application file for complete search history.

(56) References Cited

U.S. PATENT DOCUMENTS

| | | | |
|---|---|---|---|
| 2,215,900 A | 9/1940 | Bitner | |
| 2,224,178 A | 12/1940 | Bitner | |
| 2,254,961 A | 9/1941 | Harris | |
| 2,254,962 A | 9/1941 | Harris et al. | |
| 2,387,816 A | 10/1945 | Wagner | |
| 3,593,014 A | 7/1971 | Vesely | |
| 3,700,883 A | 10/1972 | Donohue et al. | |
| 4,344,110 A | 8/1982 | Ruediger | |
| 4,389,698 A | 6/1983 | Cibie | |
| 4,577,260 A | 3/1986 | Tysoe | |
| 4,613,927 A | 9/1986 | Brandt | |
| 4,642,740 A | 2/1987 | True | |
| 4,704,661 A | 11/1987 | Kosmatka | |
| 4,753,520 A | 6/1988 | Silverglate | |
| 4,770,514 A | 9/1988 | Silverglate | |
| 4,826,273 A | 5/1989 | Tinder et al. | |
| 4,927,248 A | 5/1990 | Sakakibara et al. | |
| 4,958,263 A | 9/1990 | Davenport et al. | |
| 4,972,302 A | 11/1990 | Masuyama et al. | |
| 5,042,928 A | 8/1991 | Richards | |
| 5,081,564 A | 1/1992 | Mizeguchi et al. | |
| 5,161,059 A | 11/1992 | Swanson et al. | |

(Continued)

FOREIGN PATENT DOCUMENTS

DE          3317519 A1    11/1948

(Continued)

OTHER PUBLICATIONS

Product Brochure—The LED Light.com; Luxeon LEDs, Assemblies, and Accessories; pp. 1-4, Jul. 27, 2005.

(Continued)

*Primary Examiner*—Anabel M Ton
(74) *Attorney, Agent, or Firm*—Brinks Hofer Gilson & Lione

(57) ABSTRACT

An automotive light assembly produces numerous beam patterns meeting automotive requirements through the reduction of light scatter and collection and redirection in efficiencies. A light source projects light laterally, which is collected by a light conducting body having a hub and a plurality of fingers extending from the hub. By using a plurality of small individual fingers, large and bulky light pipes are eliminated and the light collection and redirection efficiency is improved.

19 Claims, 2 Drawing Sheets

U.S. PATENT DOCUMENTS

| | | |
|---|---|---|
| 5,184,883 A | 2/1993 | Finch et al. |
| 5,276,594 A | 1/1994 | Burkett et al. |
| 5,311,410 A | 5/1994 | Hsu et al. |
| 5,343,330 A | 8/1994 | Hoffman et al. |
| 5,369,554 A | 11/1994 | Erion |
| 5,434,756 A | 7/1995 | Hsu et al. |
| 5,440,456 A | 8/1995 | Bertling et al. |
| 5,485,317 A | 1/1996 | Perissinotto et al. |
| 5,526,190 A | 6/1996 | Hubble, III et al. |
| 5,532,909 A | 7/1996 | Ban et al. |
| 5,567,031 A | 10/1996 | Davenport et al. |
| 5,577,492 A | 11/1996 | Parkyn, Jr. et al. |
| 5,608,290 A | 3/1997 | Hutchisson et al. |
| 5,642,933 A | 7/1997 | Hitora |
| 5,757,557 A | 5/1998 | Medvedev et al. |
| 5,775,792 A | 7/1998 | Wiese |
| 5,813,743 A | 9/1998 | Naka |
| 5,898,267 A | 4/1999 | McDermott |
| 5,914,760 A | 6/1999 | Daiku |
| 5,931,576 A | 8/1999 | Kreysar et al. |
| 5,947,587 A | 9/1999 | Keuper et al. |
| 6,007,226 A | 12/1999 | Howard |
| 6,075,652 A | 6/2000 | Ono et al. |
| 6,097,549 A | 8/2000 | Jenkins et al. |
| 6,123,440 A | 9/2000 | Albou |
| 6,129,447 A | 10/2000 | Futami |
| 6,139,147 A | 10/2000 | Zhang |
| 6,152,588 A | 11/2000 | Scifres |
| 6,168,302 B1 * | 1/2001 | Hulse .................. 362/511 |
| 6,191,889 B1 | 2/2001 | Maruyama |
| 6,206,554 B1 | 3/2001 | Schuster et al. |
| 6,220,733 B1 * | 4/2001 | Gordon .................. 362/500 |
| 6,283,623 B1 | 9/2001 | Chinniah et al. |
| 6,292,293 B1 | 9/2001 | Chipper |
| 6,305,830 B1 | 10/2001 | Zwick et al. |
| 6,327,086 B1 | 12/2001 | Unno |
| 6,334,702 B1 | 1/2002 | Albou |
| 6,352,359 B1 | 3/2002 | Shie et al. |
| 6,356,394 B1 | 3/2002 | Glienicke |
| 6,367,950 B1 | 4/2002 | Yamada et al. |
| 6,367,954 B1 | 4/2002 | Futami |
| 6,367,957 B1 | 4/2002 | Hering et al. |
| 6,402,355 B1 | 6/2002 | Kinouchi |
| 6,431,738 B1 | 8/2002 | Kondo et al. |
| 6,447,155 B2 | 9/2002 | Kondo et al. |
| 6,454,443 B2 | 9/2002 | Natsume et al. |
| 6,462,874 B1 | 10/2002 | Soskind |
| 6,481,864 B2 | 11/2002 | Hosseini et al. |
| 6,527,411 B1 | 3/2003 | Sayers |
| 6,536,918 B1 | 3/2003 | Boroczki et al. |
| 6,543,923 B2 | 4/2003 | Tamai |
| 6,547,423 B2 | 4/2003 | Marshall et al. |
| 6,560,038 B1 | 5/2003 | Parkyn, Jr. et al. |
| 6,604,843 B2 | 8/2003 | Shpizel |
| 6,616,299 B2 | 9/2003 | Martineau |
| 6,616,305 B1 | 9/2003 | Simon |
| 6,623,132 B2 | 9/2003 | Lekson et al. |
| 6,626,565 B2 | 9/2003 | Ishida |
| 6,679,618 B1 | 1/2004 | Suckow et al. |
| 6,698,908 B2 | 3/2004 | Sitzema, Jr. et al. |
| 6,724,543 B1 | 4/2004 | Chinniah et al. |
| 6,726,346 B2 | 4/2004 | Shoji |
| 6,755,556 B2 * | 6/2004 | Gasquet et al. ............. 362/329 |
| 6,757,109 B2 | 6/2004 | Bos |
| 6,783,269 B2 | 8/2004 | Pashley et al. |
| 6,805,456 B2 | 10/2004 | Okuwaki |
| 6,807,019 B2 | 10/2004 | Takeuchi et al. |
| 6,814,475 B2 | 11/2004 | Amano |
| 6,814,480 B2 | 11/2004 | Amano |
| 6,819,505 B1 | 11/2004 | Cassarly et al. |
| 6,819,506 B1 | 11/2004 | Taylor et al. |
| 6,824,284 B2 | 11/2004 | Chinniah et al. |
| 6,899,443 B2 | 5/2005 | Rizkin et al. |
| 6,910,783 B2 | 6/2005 | Mezei et al. |
| 7,063,391 B2 * | 6/2006 | Peng ..................... 301/37.41 |
| 7,118,253 B1 * | 10/2006 | Simon .................... 362/328 |
| 7,123,419 B1 * | 10/2006 | Simon .................... 359/641 |
| 7,160,010 B1 * | 1/2007 | Chinniah et al. ............. 362/511 |
| 7,182,481 B2 * | 2/2007 | Shimura .................... 362/244 |
| 2002/0008969 A1 | 1/2002 | Mabuchi et al. |
| 2002/0080615 A1 | 6/2002 | Marshall et al. |
| 2002/0093820 A1 | 7/2002 | Pederson |
| 2002/0126400 A1 | 9/2002 | Muller-Rissmann et al. |
| 2002/0136022 A1 | 9/2002 | Nakata |
| 2002/0167820 A1 | 11/2002 | Haering et al. |
| 2002/0172052 A1 | 11/2002 | Perlo et al. |
| 2003/0007359 A1 | 1/2003 | Sugawara et al. |
| 2003/0067784 A1 | 4/2003 | Erber |
| 2003/0075167 A1 | 4/2003 | Minano Dominguez et al. |
| 2003/0099113 A1 | 5/2003 | Gebauer et al. |
| 2003/0123159 A1 | 7/2003 | Morita et al. |
| 2003/0123262 A1 | 7/2003 | Suehiro et al. |
| 2003/0218882 A1 | 11/2003 | Wirth et al. |
| 2003/0235050 A1 | 12/2003 | West et al. |
| 2004/0012976 A1 * | 1/2004 | Amano .................... 362/511 |
| 2004/0070855 A1 * | 4/2004 | Benitez et al. ............. 359/858 |
| 2004/0109326 A1 | 6/2004 | Uhl |
| 2004/0114393 A1 | 6/2004 | Galli |
| 2004/0120157 A1 | 6/2004 | Bottesch et al. |
| 2004/0130904 A1 | 7/2004 | Yamada et al. |
| 2004/0141323 A1 * | 7/2004 | Aynie et al. ................. 362/308 |
| 2004/0145899 A1 | 7/2004 | Riebling et al. |
| 2004/0150991 A1 | 8/2004 | Ouderkirk et al. |
| 2004/0179349 A1 | 9/2004 | Buelow, II et al. |
| 2004/0202003 A1 | 10/2004 | Lyst, Jr. |
| 2004/0212998 A1 | 10/2004 | Mohacsi |
| 2004/0218392 A1 | 11/2004 | Leadford |
| 2004/0257827 A1 | 12/2004 | Ishida et al. |
| 2004/0264199 A1 | 12/2004 | Shu et al. |
| 2005/0007753 A1 | 1/2005 | Van Hees et al. |
| 2005/0024744 A1 | 2/2005 | Falicoff et al. |
| 2005/0057938 A1 * | 3/2005 | Mertens et al. ............. 362/487 |
| 2005/0078483 A1 | 4/2005 | Bernard et al. |
| 2005/0083699 A1 | 4/2005 | Rhoades et al. |

FOREIGN PATENT DOCUMENTS

| | | |
|---|---|---|
| EP | WO 89/08223 | 8/1989 |
| JP | 05205511 | 8/1993 |
| JP | 06260006 | 9/1994 |
| JP | 02001257381 | 9/2001 |

OTHER PUBLICATIONS

Product Brochure—Carclo Precision Optics; LED Optics; 2 Pages.
DE 3317519 A1—English Abstract—Published Nov. 15, 1948.
JP05205511—English Abstract—Published Aug. 13, 1993.
JP06260006—English Abstract—Published Sep. 16, 1994.
JP02001257381—English Abstract—Published Sep. 21, 2001.
WO 89/08223—English Abstract—Published Aug. 9, 1989.

* cited by examiner

LIGHT ASSEMBLY FOR AUTOMOTIVE LIGHTING APPLICATIONS

FIELD OF THE INVENTION

The present invention relates generally to light assemblies for automotive applications, and more particularly relates to light assemblies employing light emitting diodes as light sources.

Accordingly, there exists a need to provide an automotive lighting assembly capable of employing an LED light source to meet the special requirements of automotive lighting functions.

BACKGROUND OF THE INVENTION

Light emitting diodes (LED's) are fast becoming a preferable light source for automotive lighting applications, as they consume less power but provide light output which is acceptable for such applications. In order to employ LED's and automotive applications, high levels of efficiency must be obtained in both light collection as well as light distribution. Typically, reflectors or lenses or light pipes are utilized to collect and distribute the light for the particular lighting application. Unfortunately, not all automotive applications, such as the stop function of a tail light, have been effectively produced utilizing an LED light source and such reflectors, lenses or light pipes.

BRIEF SUMMARY OF THE INVENTION

The present invention provides an automotive light assembly which produces numerous beam patterns meeting automotive requirements through the reduction of light scatter and efficient collection and redirection of light from a light source. The light assembly is arranged along a longitudinal axis, and generally comprises a light source and a light conducting body. The light source projects light laterally relative to the longitudinal axis. The light conducting body includes a hub and a plurality of fingers extending from the hub. The hub is positioned adjacent the light source and has a laterally facing surface receiving light from the light source. Each of the plurality of fingers extends laterally and longitudinally from the hub, and include a longitudinally facing surface for emitting the light passing through the plurality of fingers. By using a plurality of small individual fingers, large and bulky light pipes may be eliminated and the light collection and redirection efficiency improved.

According to more detailed aspects, each of the plurality of fingers includes a first portion connected to the hub and extending laterally from the hub, and a second portion connected to the first portion and extending longitudinally from the first portion. An angled outer surface is provided at the intersection of the first and second portions to redirect light from the lateral direction to the longitudinal direction. Alternatively, each of the plurality of fingers may follow a curved shape which redirects light from the lateral direction to the longitudinal direction. The plurality of fingers is arranged in a pattern corresponding to an automotive lighting function, and preferably are circumferentially spaced and arranged in a circular pattern. The longitudinally facing surfaces of the plurality of fingers may take many forms, including flat, curved or other shapes which include beam spreading features for creating the desired beam pattern.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
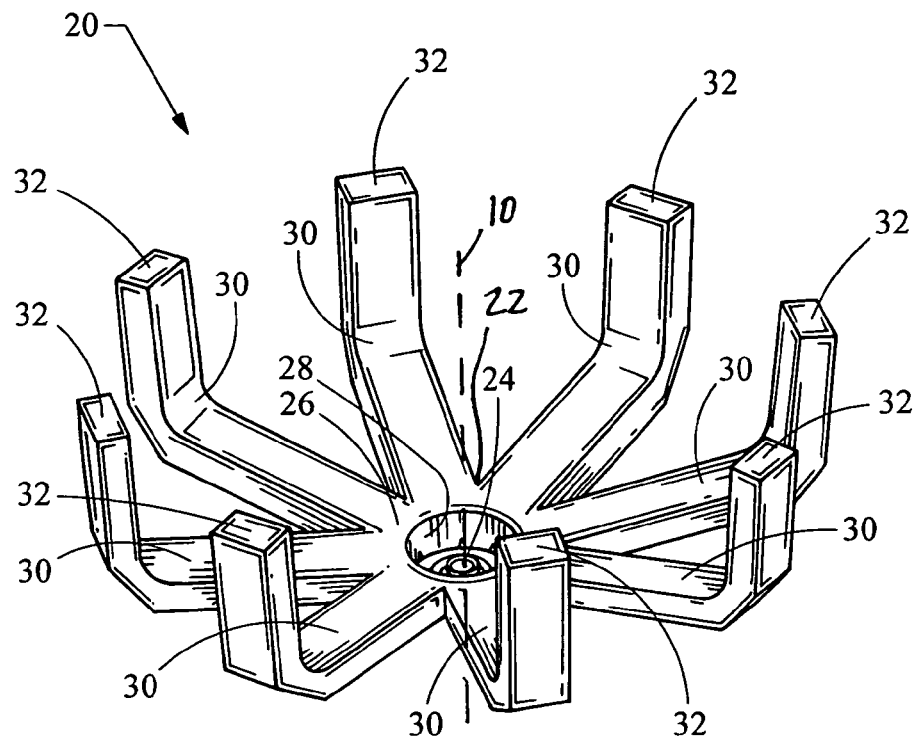
FIG. 1 is a perspective view of a light assembly constructed in accordance with the teachings of the present invention.

Turning now to the figures, FIG. 1 depicts a perspective view of an automotive light assembly 20 constructed in accordance with the teachings of the present invention. The light assembly 20 is generally arranged along a longitudinal axis 10, and includes a light conducting body 22 and a light source 24.

Figure 2:
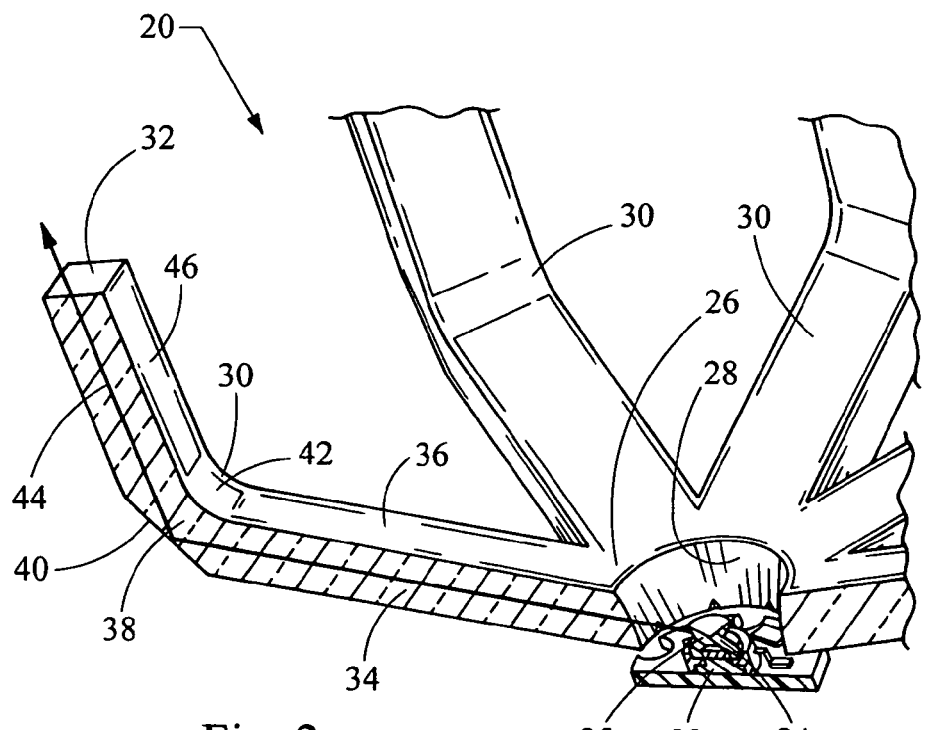
FIG. 2 is an enlarged, partially cut-away view of the light assembly depicted in FIG. 1.

As best seen in the enlarged, partially cut-away view of FIG. 2, the light source 24 generally includes a light emitting diode (LED) 23 coupled with a near field lens 25 for redirecting the light laterally relative to the longitudinal axis 10. It will be recognized by those skilled in the art that various types of LED's or other light sources may be employed, and likewise various lenses, reflectors or other devices may be used to direct the light laterally. For example, numerous LED's are constructed to emit light to the side (i.e. laterally) thus obviating the need for a redirecting lens 25. Alternatively, a side-emitting, ring-shaped, near field lens may be built as an integral part of the hub 26 replacing the laterally facing inner surface 28.

The light conducting body 22 generally comprises a hub 26 and a plurality of fingers 30. The hub 26 is positioned adjacent the light source 24 and has a laterally facing surface 28 receiving light from the light source 24. Stated another way, the hub 26 includes a central passageway which defines the laterally facing surface 28 and receives at least a portion of the light from light source 24. The hub 26 has been depicted as annular, and specifically circular in shape, although it will be recognized by those skilled in the art that the light source 24 could emit light over a limited range that is less than 360 degrees, and thus the hub 26 could similarly span less than 360 degrees and be semi-annular.

The plurality of fingers 30 are connected to the hub 26 and extend laterally and longitudinally from the hub 26. Each of the fingers 30 includes a longitudinally facing surface 32 for emitting light passing through the fingers 30. As such, the laterally directed light from the source 24 is collected by the hub 26 and its laterally facing surface 28, and is then transmitted and redirected by the plurality of fingers 30 longitudinally to the longitudinally facing surface 32.

As shown in FIG. 2, each finger 30 generally includes a first portion 34 which extends laterally and directs light thereallong through the principle of total internal reflection. That is, the outer surface 36 of the first portion 34 reflects a majority of the light passing therethrough, the light laterally away from the light source 24. A bend 38 of each finger 30 includes an outer angled surface 40 which redirects the light from the first portion 34 to a second portion 44. A curved inner surface 42 is positioned on the opposite side of the angled outer surface 40 for reflection of incident light. The curved inner surface 42 may also be deleted, causing surface 36 and 46 to meet at a sharp corner. The second portion 44 of the finger 30 extends longitudinally, and similar to the first portion 34 includes an outer surface 46 which directs light there along to the longitudinally facing surface 32 where light exits. As shown in FIG. 2, the longitudinally facing surface 32 is generally flat. In sum, it can be seen that light is projected laterally from the light source 24 through the hub 26 and into one of the first portions 34 of the fingers 30, and is then redirected by angled outer surface 40 through second portion 44 and exits via the longitudinally facing surface 32.

In this manner, a typically large reflector or light pipe can be replaced by the light conducting body 22 of the present invention, which contains significantly less material. As such, less light is scattered, and more light is efficiently collected and redirected in the desired direction. Furthermore, the plurality of fingers 30 may be arranged and constructed to provide a desired beam pattern. For example, the fingers 30 and their longitudinally facing surfaces 32 have been shown in a circumferentially spaced and circular pattern, corresponding to the stop function for a tail light. While this particular function and shape has been shown, it will be recognized by those skilled in the art that numerous other shapes and automotive functions may be readily employed through the lighting assembly 20 constructed in accordance with the teachings of the present invention.

Figure 3:
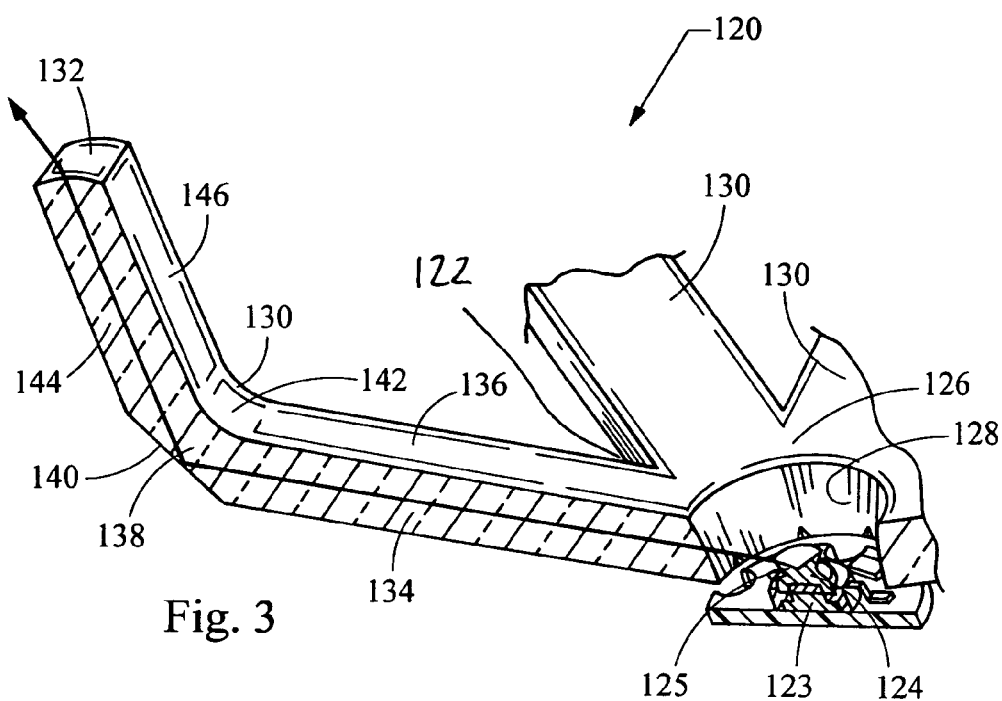
FIG. 3 is an enlarged, partially cut-away view of an alternate embodiment of a light assembly constructed in accordance with the teachings of the present invention.
Figure 4:
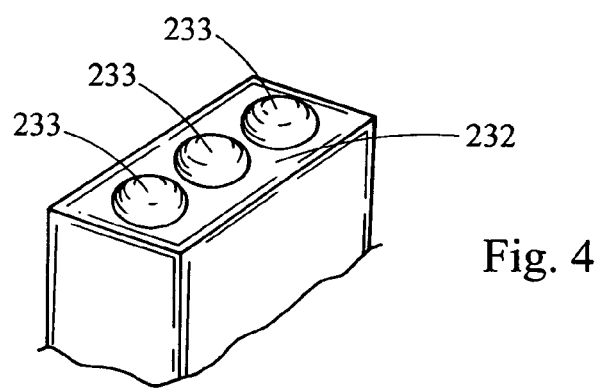
FIG. 4 is an enlarged, partially cut-away view of an alternate embodiment of a light assembly constructed in accordance with the teachings of the present invention.
Figure 5:
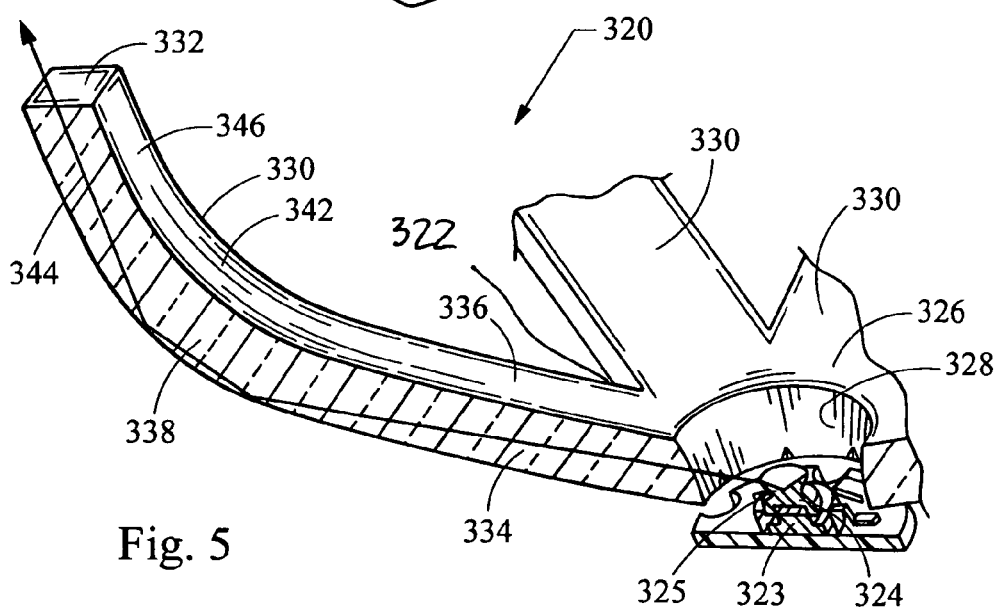
FIG. 5 is an enlarged, partially cut-away view of an alternate embodiment of a light assembly constructed in accordance with the teachings of the present invention.

It will also be recognized by those skilled in the art that various other functional effects may be obtained through the construction of the light conducting body 22. For example, the longitudinally facing surfaces 132 may take a curved shape, as shown in FIG. 3. Likewise, the longitudinally facing surfaces 232 may include beam spreading optics such as the pillows 233 depicted in FIG. 4. It will be recognized that various other beams spreading optics may be formed in the longitudinally facing surface 232, such as flutes, prisms, grooves, series of undulations, or other surface disturbances or surface shapes. It will also be recognized that the use of laterally extending first portion 34 and longitudinally extending second portion 44, interconnected by bend 38 may be replaced with a curved finger 330, as is shown in FIG. 5. The finger 330 may follow a parabolic shape or alternatively may follow a numerically generated curvature which is designed to redirect substantially all of the light from the lateral direction to the longitudinal direction and out of the longitudinally facing surface 332.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An automotive light assembly arranged along a longitudinal axis, the light assembly comprising:
    a light source projecting light laterally relative to the longitudinal axis;
    a light conducting body having a hub and a plurality of fingers extending from the hub;
    the hub positioned adjacent the light source and having a laterally facing surface receiving light from the light source; and
    each of the plurality of fingers extending laterally and longitudinally from the hub, and including a longitudinally facing surface for emitting light passing through the plurality of fingers.

2. The light assembly of claim 1, wherein each of the plurality of fingers includes a first portion connected to the hub and extending laterally from the hub, and a second portion connected to the first portion and extending longitudinally from the first portion.

3. The light assembly of claim 2, wherein each of the plurality of fingers includes an angled outer surface at the intersection of the first and second portions.

4. The light assembly of claim 3, wherein light traveling laterally through the first portion is reflected off the angled outer surface to the second portion.

5. The light assembly of claim 3, wherein each of the plurality of fingers includes a curved inner surface at the intersection of the first and second portions.

6. The light assembly of claim 1, wherein each of the plurality of fingers follows a curved shape.

7. The light assembly of claim 1, wherein the plurality of fingers are circumferentially spaced.

8. The light assembly of claim 1, wherein the hub circumscribes the light source.

9. The light assembly of claim 1, wherein the hub includes a passageway defining the laterally facing surface and receiving at least a portion of the light source therein.

10. The light assembly of claim 1, wherein at least one longitudinally facing surface is flat.

11. The light assembly of claim 1, wherein at least one longitudinally facing surface is curved.

12. The light assembly of claim 1, wherein at least one longitudinally facing surface includes beam spreading features.

13. The light assembly of claim 1, wherein the longitudinally facing surfaces are arranged in a pattern corresponding to an automotive lighting function.

14. The light assembly of claim 13, wherein the longitudinally facing surfaces are arranged in a circular pattern.

15. The light assembly of claim 1, wherein the light source is a light emitting diode.

16. The light assembly of claim 1, wherein the light source includes a lens directing the light laterally from the light source.

17. An automotive light assembly arranged along a longitudinal axis, the light assembly comprising:
    a light source projecting light laterally relative to the longitudinal axis, the light source including a lens directing the light laterally from the light source, the lens being a ring-shaped, side-emitting, near field lens surrounding the light source and engaging the hub;
    a light conducting body having a hub and a plurality of fingers extending from the hub;
    the hub positioned adjacent the light source and having a laterally facing surface receiving light from the light source; and each of the plurality of fingers extending laterally and longitudinally from the hub, and including a longitudinally facing surface for emitting light passing through the plurality of fingers.

18. An automotive light assembly arranged along a longitudinal axis, the light assembly comprising:

a light source having a lens projecting light laterally relative to the longitudinal axis, the lens being a ring-shaped, side-emitting, near field lens surrounding the light source; and a light conducting body extending laterally and longitudinally to redirect the light longitudinally, the light conducting body having a laterally facing surface receiving light from the light source and a plurality of longitudinally facing surfaces for emitting light longitudinally, the plurality of the longitudinally facing surfaces being arranged in a pattern corresponding to an automotive lighting function, the light conducting body including a central hub defining the laterally facing surface, and including a plurality of fingers defining the plurality of longitudinally facing surfaces.

19. The light assembly of claim 17, wherein the plurality of fingers are circumferentially spaced.

* * * * *